United States Patent
Trapp et al.

(10) Patent No.: US 7,107,445 B2
(45) Date of Patent: Sep. 12, 2006

(54) METHOD AND APPARATUS FOR SECURE PROCESSING OF SENSITIVE DATA

(75) Inventors: Martin Trapp, Baden-Baden (DE); Sonja Zwissler, Freudenstadt (DE)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 10/065,802

(22) Filed: Nov. 20, 2002

(65) Prior Publication Data

US 2004/0098454 A1    May 20, 2004

(51) Int. Cl.
*G06F 17/60* (2006.01)

(52) U.S. Cl. .......................... 713/150; 705/1; 705/12; 705/50; 705/59; 705/64; 709/205; 709/320; 713/155; 713/189; 713/192; 463/29; 726/2; 726/26

(58) Field of Classification Search ........ 709/201–207, 709/320; 713/189–192, 155
See application file for complete search history.

(56) References Cited

U.S. PATENT DOCUMENTS

| | | | |
|---|---|---|---|
| 5,650,948 A | | 7/1997 | Gafter |
| 6,070,159 A | * | 5/2000 | Wilson et al. .................. 707/3 |
| 6,092,202 A | * | 7/2000 | Veil et al. .................... 713/201 |
| 6,099,408 A | * | 8/2000 | Schneier et al. ............... 463/29 |
| 6,148,290 A | | 11/2000 | Dan et al. |
| 6,167,521 A | | 12/2000 | Smith et al. |
| 6,314,409 B1 | | 11/2001 | Schneck et al. |
| 6,516,350 B1 | * | 2/2003 | Lumelsky et al. .......... 709/226 |
| 6,658,568 B1 | | 12/2003 | Ginter et al. |
| 6,678,827 B1 | * | 1/2004 | Rothermel et al. ......... 713/201 |
| 2002/0194049 A1 | * | 12/2002 | Boyd ............................. 705/9 |
| 2003/0115149 A1 | * | 6/2003 | Dan et al. ..................... 705/64 |

OTHER PUBLICATIONS

Chess, David et al, "Itinerant Agents for Mobile Computing", IEEE Personal Communications, IEEE, Oct. 1995, pp. 34-49, entire document, http://ieeexplore.ieee.org/iel4/98/9856/00468361.pdf?arnumber=468361.*

Communications of the ACM Issue ACM Press 43 (2), 2000, pp. 90-98. Title Biometric Identification; Anil Jain, Lin Hong and Sharath Pankanti.

RC 21806(Log#98098)(Jul. 27, 2000)Computer Science/Mathematics: IBM Research Report- "Practical Private Information Retrieval with Secure Coprocessors"; S.W. Smith and D. Safford. IBM Research Division TJ Watson Research Center PO Box 704 Yorktown Heights, NY 10598.

(Continued)

*Primary Examiner*—Christopher Revak
*Assistant Examiner*—Ronald Baum
(74) *Attorney, Agent, or Firm*—Derek S. Jennings; Cantor Colburn LLP

(57) ABSTRACT

Apparatus for a multiparty electronic service having at least one host computer being operative to maintain and enforce at least one machine-interpretable service specification (contract) for governing a service between the parties that interact in the processing of a service request. The at least one host computer determines, in accordance with the at least one service specification, the validity of a request and conditionally executes a sequence of processing steps as defined in the service specification. The at least one host computer is further operative to conditionally provide notifications to the contract parties. Machine-interpretable service specifications are negotiated between all parties that cooperate in the processing of a request. Machine-interpretable service specifications can be dynamically added to and cancelled from the system.

68 Claims, 15 Drawing Sheets

OTHER PUBLICATIONS

Overview of Current Criminal Justice Information Systems: by James X. Dempsey, Center for Democracy & Technology(www.edt.org).

Interacting with Identification Technology: Can It Make us More Secure?: Jean Scholtz NIST, MS 8940, 100 Bureau Drive Gaithersburg, MD 20899 USA, Jeff Johnson UI Wizards, Inc. 231 Moscow St., San Francisco, CA 94112 USA (CHI 2002, Apr. 20-25, 2002, Ninneaoplis MN, ACM 1-58113-454-1/02/0004.

Policy Based SLA Management in Enterprise Networks; Dinesh Verma, Mandis Beigi, and Raymond Jennings; IBM Thomas J Watson Research Center PO Box 704 Yorktown Heights, NY 10598 USA-M. Sloman, J. Lobo and E. Lupu(Eds>): Policy 2001, LNCS 1995,pp. 137-152, 2001. © Springer-Verlag Berlin Heidleberg 2001.

Notification of Transmittal of International Preliminary Examination Report- From the International Preliminary Examining Authority for PCT/US03/25720; mailed, Sep. 24, 2004.

Notification of Transmittal of International Search Report or the Declaration- From the International Preliminary Examining Authority for PCT/US03/25720; mailed, 16, Aug. 2004.

\* cited by examiner

| Contract ID: | 4711B5 | | | | | | | | |
|---|---|---|---|---|---|---|---|---|---|
| Parties: | A: | ABC Airport | | | | | | | |
| | B: | QRS Agency | | | | | | | |
| | C: | XYZ Law Enforcement | | | | | | | |

| Action / Owner / Condition | Item | 1:n Matching | Biometric Matching | Decoy Generation | Response1 | Response2 | Response3 | Response4 |
|---|---|---|---|---|---|---|---|---|
| Request / A | Contract Id | / | / | + | / | / | / | / |
| | First Name | + | / | / | + | + | / | / |
| | Last Name | + | / | / | + | + | / | / |
| | Date of Birth | + | / | / | + | + | / | / |
| | Act. Finger Print | / | + | / | / | / | / | / |
| | Location | / | / | / | + | + | / | / |
| | Transaction No. | / | / | / | / | / | / | + |
| 1:n Matching against Watch List XYZ / B / True | Matched | / | / | / | / | / | / | / |
| | First Name | / | / | / | + | + | / | / |
| | Last Name | / | / | / | + | + | / | / |
| | Date of Birth | / | / | / | + | + | / | / |
| | Suspect Class | / | / | / | / | / | / | / |
| | Filed Finger Print | / | + | / | / | / | / | / |
| | Previous Convictions | / | / | / | / | / | / | / |
| | Reaction Advice | / | / | / | + | / | / | / |
| Biometric Match / C / Matched | Correlation | | / | / | + | + | / | / |
| Decoy Generation / B / NOT Matched | Decoy | | | / | / | + | / | / |
| Notification1 / C / Matched AND Suspect Class<5 | Return Code C | | | | | / | / | + |
| Notification2 / C / Matched AND Suspect Class<4 | Return Code C | | | | | / | / | + |
| Notification3 / C / NOT Matched | Return Code C | | | | | / | / | + |
| Notification4 / A / True | Return Code A | | | | | | | + |

Legend:  ⊞ include data item (row) in action's (column) input specification,
/ exclude data item from action's input specification,
□ not applicable, since data item is not yet computed

FIG. 6

— Crypto coprocessor
— secure storage & communication
— Outer cell perimeter

METHOD AND APPARATUS FOR SECURE PROCESSING OF SENSITIVE DATA

BACKGROUND OF INVENTION

1. Field of the Invention

The present invention relates to a system and method for the secure processing of sensitive data. More specifically, the invention relates to systems where parties, which do not necessarily trust each other, need to control the processing and the use of their data.

2. Background of the Invention

Many IT applications are comprised of the processing of sensitive data, i.e. data that should be kept private or confidential by the IT system. A typical example for such an application is the screening of individuals against watch lists prior to boarding an airplane, or prior to employment. Such a screening can be a simple textbased matching of names and other personal data, especially, biometrics like fingerprint minutiae or features of the human face, (see Anil Jain, Lin Hong and Sharath Pankanti, "Biometric identification", Communications of the ACM, 43 (2), pages 90–98, ACM Press, 2000), can be used to confirm the identity of matched individuals or to identify individuals in a set of candidates.

Cryptographic techniques exist to encrypt and protect data while it is sent over computer networks or stored on storage media, (see for example the book Bruce Schneier, "Applied Cryptography", John Wiley & Sons, 1996). However, for the real processing steps, data has to be available in the clear to allow a computer system to interpret, and modify them, and to derive new data during the processing. During this processing, data is vulnerable to attackers, who intrude into the processing environment to spy out or modify data. IT systems have no means to protect programs and data against an attacker who found a way into their processing environment.

A way to protect an IT system against intruders is to confine the processing of sensitive data to a secure computation environment, (see Schneck, et al., "System for controlling access and distribution of digital property", U.S. Pat. No. 6,314,409, issued Nov. 6, 2001, hereby incorporated herein by reference, and Sean W. Smith and Dave Safford, "Practical Private Information Retrieval with Secure Coprocessors" hereby incorporated herein by reference, IBM Research Report, RC 21806, July 2000). A secure computation environment is a general-purpose computing device like the IBM 4758 cryptographic coprocessor, which has a FIPS 140-1 Level 4 validation, (see http://www.ibm.com/security/cryptocards). Computations in a secure computation, environment cannot be observed from the outside. Further, it is impossible to maliciously change the processing or the processed data from outside the secure computation environment. Attempts to tamper with a secure computation environment, the programs running inside, or the data being processed inside are detected by the environment, which then destroys sensitive data stored inside the environment or makes it permanently inaccessible.

While a secure computation environment can give protection against attacks from the outside, it cannot guarantee by itself that the security and privacy demands of the parties are met by the system. The parties have to trust the provider of the application that their data is handled in the way they expect. There is no technical guarantee for this, because the parties cannot control the service.

Often parties are not willing to participate in a data processing task if they cannot control the processing and the use of their data, i.e. if they have to rely totally on trust.

Existing systems do not allow the involved parties to control the service, or they simply reduce the number of parties to one to circumvent the problem. For example, some airlines have databases of their own unruly passengers, and they can check passengers against this data. Here, all roles, i.e. the service provider, the information provider, the screener and the notified parties are all represented by the airline, which naturally trusts itself. Other examples of databases are law enforcement agencies, (see James X. Dempsey, "Overview of current criminal justice information systems", in Proceedings of the 10th Conference on Computers, Freedom and Privacy, Toronto, pages 101–106, ACM Press, 2000), or credit history checks. These applications are under the complete control of the information provider, who is also the service provider. The screener party has no way to control how the service provider further uses the information that the screener provides. A similar example is a face recognition application at an airport, where passengers are checked against the picture in their own ID document. This application is under complete control of the screener, who is also the service provider.

Existing surveillance systems, as for example the facial recognition system used at the 2001 SuperBowl, or in several airports, (see Scholz and Johnson, "Interacting with identification Technology: Can it make us more secure?", in Conference on Human Factors in Computer Systems, Minneapolis, pages 564–656, ACM Press, 2002), are mostly closed circuit systems. They return a direct answer to queries that compare biometric data against a local database, or against information stored on a smart card, which is carried by the individual. Thus, there is a need for a more general service that can be used by different interacting parties.

Other systems, such as are described in U.S. Pat. No. 6,148,290, issued Nov. 14, 2000 to Asit Dan and Francis Nicholas Parr, hereby incorporated herein by reference in its entirety, have been used to define possible interaction patterns with computer programs, where the interface specifications defines sequences of requests that are admissible to a server. In these systems, the service provider dictates a service contract. The contract defines assertions for the interface of the service, e.g. that a request A must be preceded by another request B to be valid. It is not possible for the parties to use these kinds of contracts to control the processing or the use of their data.

Most existing systems do not execute in secure computation environments. Here, an attacker who gains access to the processing may observe and influence the processing at will. Thus, even if the parties agree on processing steps and handling of data, there is no technical way to guarantee that the processing fulfills their security requirements in such an insecure environment.

Existing systems built on web services (Vadim Draluk, "Discovering Web Services: An Overview", in Proceedings of the Twenty-seventh International Conference on Very Large Data Bases: Roma, Italy, page 637 Morgan Kaufmann, 2001) allow their clients to control which service provider they choose, but they allow no control over the service"s functionality itself.

Existing systems that use explicit contracts, like e.g. service level agreements or quality of service agreements as described in (Dinesh Verma, Mandis Beigi and Raymond Jennings, "Policy Based SLA Management in Enterprise Networks", in Lecture Notes in Computer Science, Vol. 1995, pages 137 152, Springer-Verlag, 2001), only deal with nonfunctional features of services like resource consumption or turnaround times. These approaches do not allow parties to control the function of the service.

SUMMARY OF INVENTION

The present invention allows multiple parties, which do not necessarily trust each other, to participate in the processing of sensitive data. The relationship between the parties is secured by machine-interpretable service specifications (also called contracts) that can be automatically enforced by the processing system. The machine-interpretable service specifications define how a request is to be processed and how the information provided by the single parties is used and disclosed in this process. The processing is preferably executed in a secure computation environment, which ensures that nobody can observe the processing or tamper with it.

In one embodiment of the invention, service specifications may be agreed upon by all parties before they are implemented into the system. In this way, the parties who use the service for the processing of sensitive data have full control over the processing and the use of their data.

In another embodiment of the invention a requester triggers the data processing by sending a service request to a server. The processing itself is neither observable nor can it be tampered with from outside. At the end of the processing, the service sends notifications to some or all the parties, which were directly or indirectly involved in the processing of the request, which may also include the requestor.

In still another embodiment of the present invention the processing of service requests is defined by service specifications, which specify the actions to be taken during the processing of a request, and how information flows between these actions. The parties who cooperate in the processing of a service request must mutually agree on a service specification before the system will execute it.

In yet another embodiment of the present invention the parties that cooperate in the processing of a request are owners of data items that are computed during the processing of a request. The owner of a data item can precisely control, to which processing step or to which other party he wants to disclose a data item.

Other features and advantages of the present invention will become apparent from the following detailed description, taken in conjunction with the accompanying drawings, which give formal specifications as well as examples of the principles of the invention.

BRIEF DESCRIPTION OF DRAWINGS

FIG. 6 shows an example contract for an application, where individuals are securely checked against watch lists according to an embodiment of the present invention.

DETAILED DESCRIPTION

Figure 1:
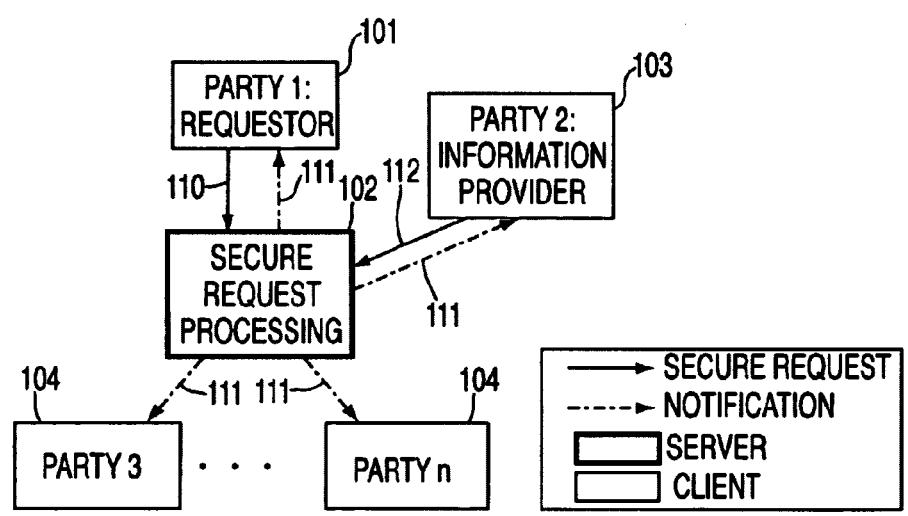
FIG. 1 illustrates a general workflow between participating parties according to an embodiment of the present invention.

The present invention defines a method for the secure processing of sensitive data as follows: a) The parties, which cooperate in the processing of sensitive data, first develop a relationship in which they agree on the functional steps that comprise the processing and on the data items that should be used in the single processing steps.

b) The parties agree on a formal specification of the processing and the use of data, which is manifested in a machine-interpretable service specification (contract). Among other information, the service specification defines the single processing steps of the processing, which data items should be used as input for a single processing step and what output the processing step contributes to the processing state.

c) The service is an interpreter for service specifications. It guarantees that the system executes exactly the functionality defined by the service specification and uses the data items only in the intended way. Especially, this means that the processing and the data items used cannot be observed or tampered with from the outside.

For a screening scenario, the involved parties might be the service provider, who operates the screening service, the screener, who wants to check an individual, several information providers, which provide the watch list data, and parties like law enforcement, airport security or human resources, which should be informed in case the screened individual is found on a watch list.

The information provider wants to keep his watch list data confidential, i.e. he allows its use for screening, but the information on the lists must not leak outside the system. The screener wants to guarantee basic privacy for the screened individuals as long as they do not show up on the watch lists. In particular, he does not want to enable the information provider to trace arbitrary individuals based on screening requests. Screener and information provider only want to notify law enforcement in case of a match and do not want to leak information in other cases. None of the parties wants that information leaks to the service provider or to intruders.

Accordingly, an apparatus for secure processing of sensitive data includes a network server, which receives a request for processing from a requestor over a secure network channel, a coprocessor based secure computation environment for processing sensitive data in a way that can not be externally observed or tampered with, and the contract engine that controls the processing of the request based on service specifications on which the parties agreed. The contract engine includes a request handler, which selects the service specification that governs the request, and checks whether the party is allowed to send the request to the server, and whether the request conforms to the service specification. A step processing unit, which performs a sequence of processing steps as defined in the service specification, thereby using and extending the processing state, which initially contains the information sent in the request. A notification generator, which selects parts of the processing state as defined in the service specification, and generates notifications, which it sends over secure network channels to the parties defined in the service specification.

FIG. 1 illustrates a general workflow between participating parties according to an embodiment of the present invention. In general, all processing is expressed by the following scheme: A distinguished party, the requester 110 sends a service request 110 to the secure request processing 102. The request processing 102 determines the service specification, which governs the processing of this request and executes a sequence of processing steps based on that service specification. The request processing 102 can also receive requests or data from another party 103 which might be based upon a different service specification. The application of a single processing step uses a subset of the processing state as input. The output of the processing step is used to extend the processing state. Input and output specifications are defined in the service specification. The initial state of the processing consists of the information from the request that triggered the processing. When all applicable processing steps have been executed, the request processing 102 generates notifications 111 for parties 101, 103 and 104 that are involved in the processing of the request. Whether a notification is sent and the contents of the messages for the parties are specified, in the service specification.

Each request can have a different requestor. For example after request 110 is processed in FIG. 1, party 103 can take on the role of the requestor and send its own service request, 112. Different kinds of service requests invoke different service specifications, which in turn provide different service functionality to the clients.

In a typical application, an information provider, 103, would from time to time send service requests, 112, to update the information that he provides to the service. The service specification that controls this kind of request specifies how the data in the request from the information provider is used to change the information inside the service. Other service requests will thereafter be processed using the updated information.

The system allows different parties to interact at the same time based on different service specifications. For example, in a screening application, there can be a multitude of different screener parties, different information providers, and different law enforcement agencies. Each request sent to the system invokes processing based on a specified service specification. The service specification determines which parties interoperate in the processing of this request. For convenience, we also define composite contracts, see further below.

Because the processing is controlled by service specifications, and the participating parties control these service specifications, they have complete control over the processing and the way their data is used. Executing the service specification in a secure computation environment guarantees that information does not leak and that no one can tamper with the processing of the data.

Figure 2:
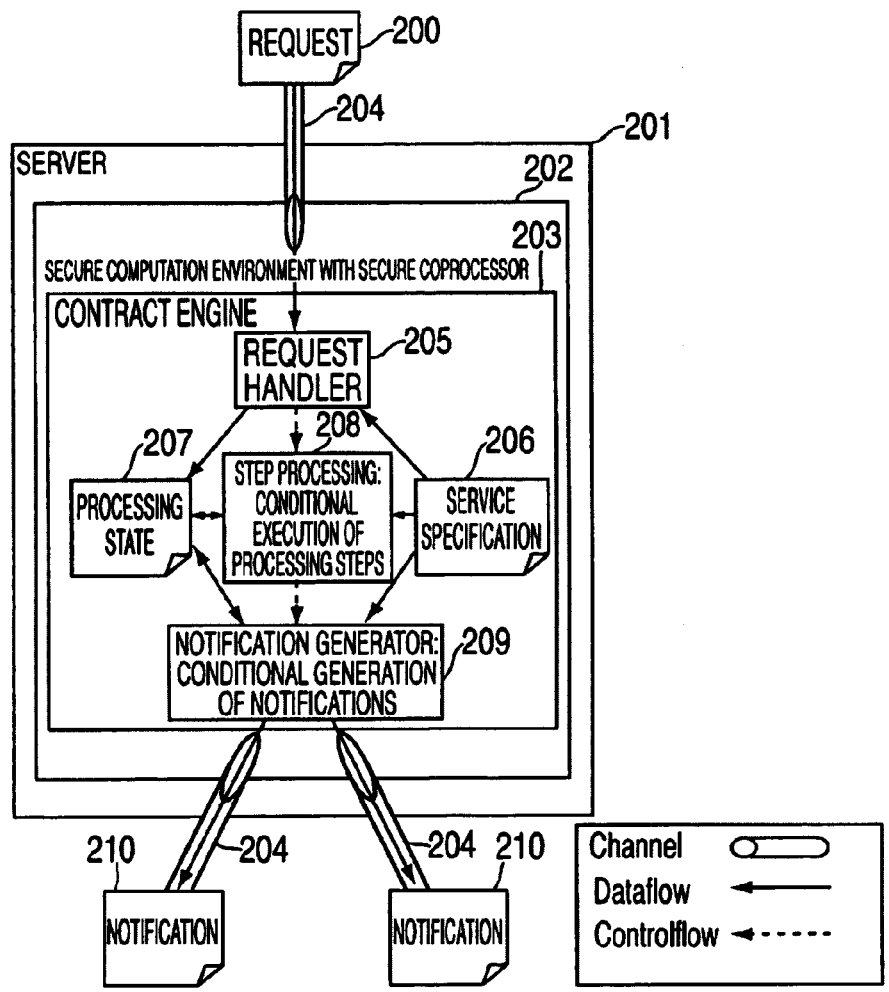
FIG. 2 shows a block diagram of a global structure of the system for secure data processing defined and controlled by service specifications according to an embodiment of the present invention.

FIG. 2 shows a block diagram of a global structure of the system for secure data processing defined and controlled by service specifications according to an embodiment of the present invention. Generally, the processing starts when the server, 201, receives a service request, 200, over a network connection, 204. The request, 200, is processed by the contract engine, 203, which consists of the request handler 205, the step processing 208 and the notification generator 209. All three components work with the processing state 207 and are controlled by a service specification 206.

The request handler 205 first checks whether the incoming request is valid and admissible for processing. It does this by checking the content of the request and the party who sent the request against information defined in the service specification, 206, which defines and controls the processing of this particular service request.

In the system which is described by the present invention, the processing of service requests is controlled by service specifications, 206. A service specification (See FIG. 6) is a formal specification, which is mutually agreed upon by all parties, who cooperate in the processing of a service request. A service specification precisely defines and controls how a server processes a request and how information is disclosed and aggregated between single processing steps during this processing.

A service specification specifies:

a) the parties that cooperate in processing a request;

b) the data items that are provided in the request message;

c) the single actions that have to be executed during the processing of a request;

d) the data items that are generated as the result of executing an action, and the ownership of these data items;

e) the workflow, which controls the application of single actions; and f) the controlled data flow between single actions, which allows the owner of a data item to precisely control, to which processing steps he wants to disclose his data, and to which he does not.

A formal data model and more details about service specifications are given below.

If the check of the incoming service request 200 by the request handler 205 fails, the request is turned down. Otherwise, if everything is acceptable, the processing continues with the processing of the single processing step in the step processing 208.

The step processing 208 uses two data structures. The service specification 206 on which the processing is based, and a processing state 207, which accumulates data items that are produced by the single processing steps during the course of the request processing. The processing state 207 is an ordered set of name/value pairs, called an ItemSet, see FIGS. 3A and 3B.

Initially, the processing state 207 of the step processing 208 consists only of the data items, which had been provided by the incoming service request 200. The step processing 208 uses the service specification 206 to determine a sequence of processing steps that should be executed to process the service request. The step processing 208 also determines from the service specification which part of the processing state should be fed into the single processing steps that comprise the processing of the service request. The results of a processing step, also defined in the service specification, are then used to extend the processing state and are therefore available for the next processing step.

While the step processing only reads the service specification, it does read and modify the processing state 207. The step processing 208 ends, when all processing steps, which the service specification specifies, are processed in the specified order.

After all processing steps have been processed by the step processing 208, control is passed to the notification generator 209. The notification generator mainly generates the notifications 210 that are sent out to the cooperating parties. Notifications are generated from the processing state. In fact, the notification generator 209 is similar to the step processing 208. The main difference is that the processing steps executed by the notification generator 209 are special because they have predefined semantics.

In its electronic form, a service specification 206 can be interpreted and executed by a computer program. If executed in a secure computation environment 202, the electronic execution of a service specification guarantees that all steps are processed in the specified order and that information exactly flows, where the service specification states it should.

A secure computation environment 202 is a computer that is sealed, so its internal processing is not observable from the outside, and no one on the outside can modify the computation or the data inside the device without proper authorization. Such a device detects attempts to open, intrude or probe it. If any of these tamper attempts are detected, the secure computation environment destroys sensitive data stored inside and ceases operation completely. An example of such a secure computation environment is the first programmable IBM 4758 cryptographic coprocessor.

The security features of secure computation environments 202 can be extended to communications over computer networks. This can be achieved by using standard cryptographic techniques on the network communications between two secure computation environments. Communication sessions secured in this way, also known as channels, 204, prevent an attacker from reading data communicated over the channel. They also make it possible to detect when an attacker tries to modify messages, insert his own messages, or impersonate one of the secure computation environments. Of course, the network is not trusted, and all cryptographic techniques have to be implemented inside the secure computation environments. For more details on channels see the description of FIG. 5.

It is worth noting, that if the system described in the present invention would not be implemented within a secure computation environment, it would be very vulnerable to a variety of attacks. In particular, in an insecure environment, electronic execution of a service specification can not guarantee, that information flows only to the specified processing steps and is never disclosed or modified, because the request 200 and the processing state 207 would be accessible to an attacker.

Figure 3A:
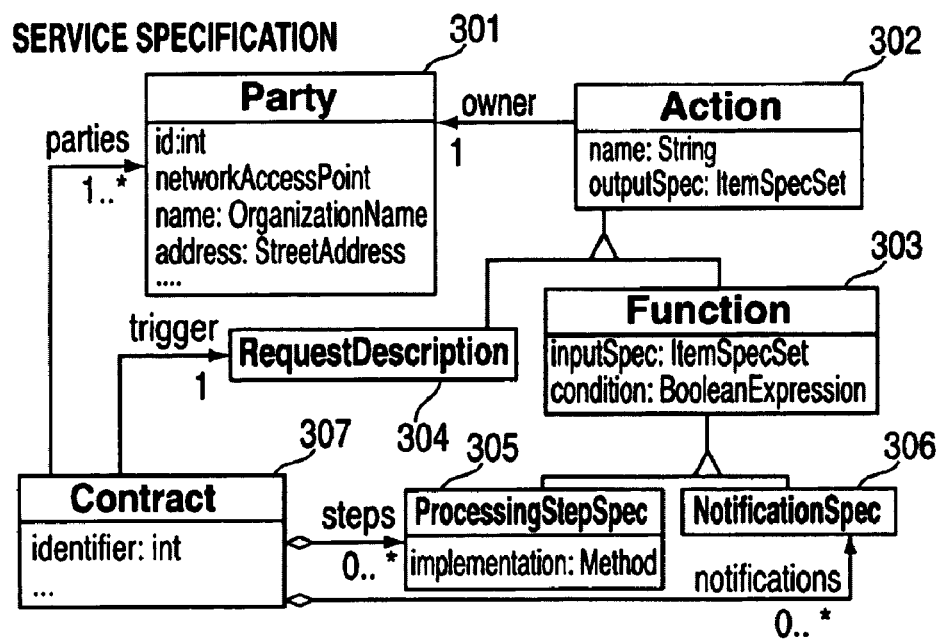
FIG. 3A shows a structure of service specifications as a class diagram in the Unified Modeling Language (UML) according to an embodiment of the present invention.

FIG. 3A shows a structure for service specifications as a class diagram in the Unified Modeling Language (UML) according to an embodiment of the present invention. We call this implementation of a service specification a contract and use the terms contract and service specification as synonyms. Each contract 307 has a contract identifier (identifier), which uniquely distinguishes this contract from all other contracts in the system. A contract 307 specifies one or more parties (parties), who will cooperate in fulfilling a service request. The Party class 301, which describes a single party, includes a unique identification of the party in the system (id), and a network access point, to which the service can send messages in response of the processing of a service request. A service access point might for example be defined by an Internet address and a port number, or by an uniform resource locator (URL). It also includes the name of the party. In one embodiment, this minimal definition of a party is most likely augmented by further attributes, like a street address, which are not required for the secure processing of requests, but might be necessary for maintaining additional relationships among the parties.

The contract 307 further specifies a single action (trigger), which is the arrival of a service request that should be processed. An object of the RequestDescription class 304 describes the incoming request, which triggers the processing as defined and controlled by this contract. In particular, the RequestDescription defines what data fields have to be present in the request.

The contract 307 still further specifies zero or more processing steps specification (steps), which are executed during the processing of the request. The specifications of the processing steps are given as an ordered list modeled by ProcessingStepSpec objects, 305. Furthermore, it specifies zero or more outgoing messages (notifications), with which the system responds to the cooperating parties after processing of a request. The notifications are given as an ordered list of NotificationSpec objects 306. An Action 302, is the common abstraction of RequestDescription 304, ProcessStepSpec 305, and NotificationSpec 306. Each action 302 has a name (name), and a specification (outputSpec) of an ordered set of data items (ItemSpecSet), which it provides after completion. It is owned by a single party (owner).

There are multiple actions that can be performed. A first type of action is the arrival of a new service request. The owner of the RequestDescription 304 defines the requestor, i.e. the party, which can send this kind of requests. The outputSpec of a RequestDescription 304 action describes the data items that are present in the request. Each request has at least one mandatory item called identifier, which is used to uniquely identify the contract that defines and controls the processing of this request.

A second type of action is a Function 303. A function 303 takes an ordered set of data items as input (inputSpec) and returns an ordered set of data items as output (outputSpec). The execution of a function is controlled by a Boolean expression (condition). The Boolean expression is an expression that is constructed from the special constants 'true' and 'false', from the Boolean operators 'not', 'and', and 'or', the relational operators $<, <=, =, /=, >, >=$, from arbitrary constants, and from names of items in the processing state, see FIG. 2. The function is only executed if its condition yields true.

A Processing Step Specification 305 is a function, which is defined by one of the cooperating parties (its owner), and which can execute arbitrary functionality. The functionality to be executed is defined by referencing the code that implements the processing step.

A Notification Specification 306 is like a Processing Step Specification 305, but the functionality provided by a notification is predefined and fixed. It cannot be changed by the cooperating parties. Likewise, the number of items in the Notification"s output specification is fixed to one. However, the name of this return code can be freely defined.

Figure 3B:
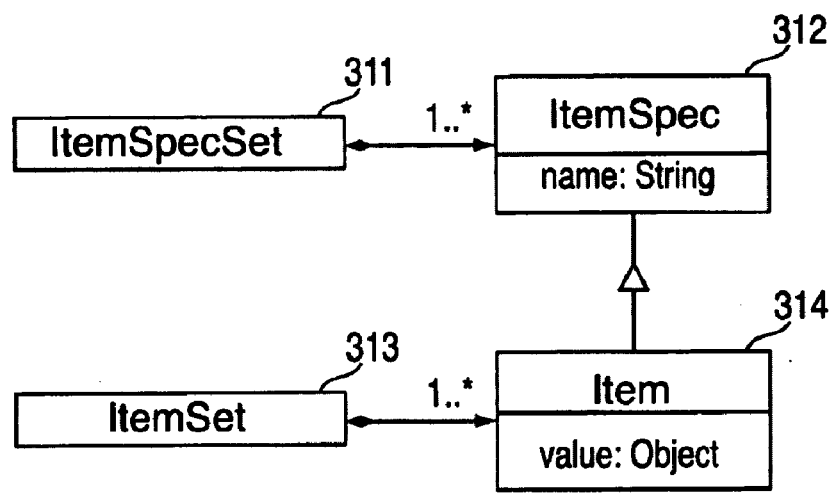
FIG. 3B shows a UML specification of ItemSets and ItemSpecSets according to an embodiment of the present invention.

FIG. 3B shows a UML specification of ItemSets and ItemSpecSets according to an embodiment of the present invention. ItemSpecSets 311 are used to define inputSpecs and outputSpecs. An ItemSpecSet 311 defines an ordered set of data item specifications called ItemSpec 312. A data item specification identifies a data item by its name (name). A data item defined by the Item class 314 is a name/value pair. An ItemSet 313 is an ordered set of data items.

Figure 4A:
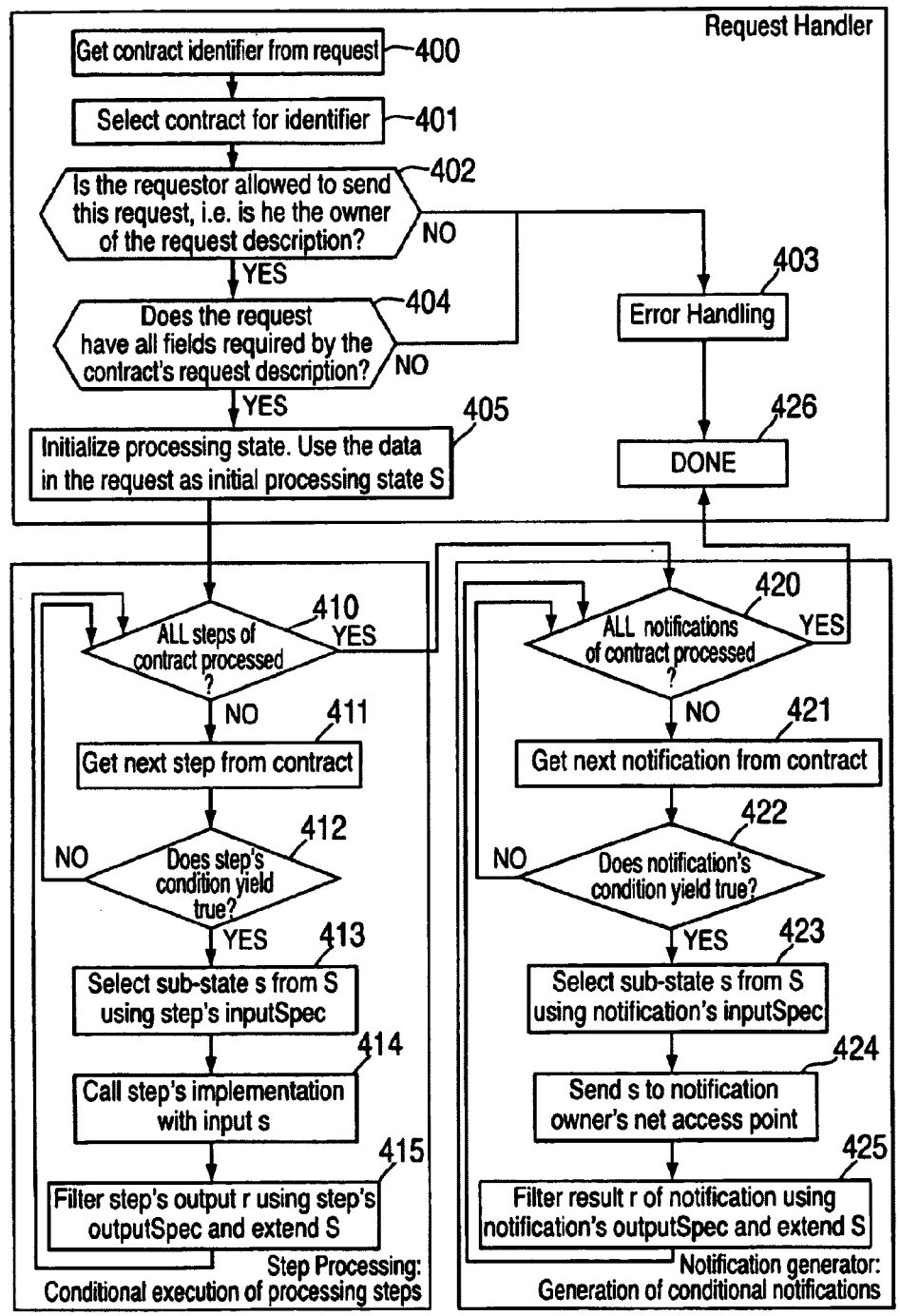
FIG. 4A shows a flow chart diagram for the processing of the Request Handler, the conditional execution of the processing steps and the conditional generation of the notifications according to an embodiment of the present invention.

FIG. 4A shows a flow chart diagram for the processing of the Request Handler, the Step Processing, and the Notification Generator according to an embodiment of the present invention. An incoming request can be an item set as defined in FIGS. 3A and 3B. When the server receives a new service request, in step 400, the request handler first extracts the mandatory item identifier from the item set that constitutes the request. The value of the identifier item allows the request handler in step 401 to retrieve the contract (service specification), which controls the processing of the incoming service request. Then in step 402, the request handler checks whether it accepts the request from this sender. For this check, the request handler selects the party that owns the trigger of the contract and compares it to the party on the other end of the channel over which the request was received. If both values denote the same party, the request is considered for further processing; otherwise the processing terminates in step 403 with the error handler.

The next check, in step 404, determines whether the request is complete, i.e. whether it provides all the items that are required by the contract. This check is performed by asserting that all names that are defined in the output specification of the trigger occur exactly once in the request"s item set and that they all have defined values. The order, in which the items occur, does not matter. If the request has additional items that are not described in the trigger output specification, this is not considered an error. Since none of the following processing steps can access those items, they are simply ignored by the request processing and never compromised. In case of an error, the request processing terminates in step 403.

If both checks are passed, the request handler initializes the processing state S for the step processing in step 405. The initial processing state contains exactly the items, for which the names are specified by the trigger output specification.

The step processing starts with step 410. While there are more steps in the ordered list of processing steps in the contract, the step processing selects the next processing step PS in order in step 411.

Step 412 evaluates PS"s condition over the processing state S. Processing step conditions can access all items of the processing state. Since the expression being evaluated is obvious from the contract to all parties, they obviously already agreed on the particular use of items from the processing state for the evaluation of a given condition. If the condition yields false, the processing step PS is ignored and the processing continues with the next processing step specification in the list of processing steps in 410. If the step"s condition evaluates to true, step 413 builds a new item set s. The processing inserts items from the processing state S into the new item set s, if it finds their name in the input specification of processing step PS.

Step 414 determines the processing step implementation from PS"s step specification and then calls it with the new item set s as its only parameter. The result of this call is the item set r. Step 415 takes all items from r, for which the names occur in the output specification of processing step PS and inserts them into the processing state S. Step 415 never overrides existing values in S with new values from r. If an item with the same name already exists, it must also have the same value; otherwise the contract is not legal. However, several processing steps may specify the same item specifications in their output specifications, if the conditions of the processing steps or their implementations guarantee that two activated steps never produce different values for the same item name.

Once all of the processing steps are processed, the step processing unit passes control to the notification generator. This is shown in step 420. The generation of notifications follows the same basic structure as the execution of the processing steps.

While there are unprocessed notification specifications, they are processed in order. Fetching notification specifications and evaluating their condition in steps 421 and 422 is identical to the processing in steps 411 and 412 of the conditional execution of processing steps, and step 423 is similar to 413. After generating the new item set s in step 423 from the processing state S and the input specification of the actual notification, N, step 424 fetches the network access point from the party, P, who is defined as the owner of N in the notification specification. The set s is then sent out as a notification to Party P.

The output specification for each notification specification is a set with a single element. The value of this element is Boolean and states, whether the notification was successfully delivered to the party P. The name of this item can be freely defined. The item is added to the processing state S and is therefore accessible for other notifications that are not yet processed. This makes it in particular possible to send out a notification depending on whether another notification failed or succeeded, or to include return codes of former notifications in other messages. Once all notification specifications are processed, the whole request processing terminates successfully in step 426.

Even though the sequential processing of processing steps and notifications has the benefit of being simple, it might not always allow for very efficient processing. One embodiment chooses to determine the dependencies between actions, and executes independent actions in parallel once all their items given in their input specifications are available.

Figure 4B:
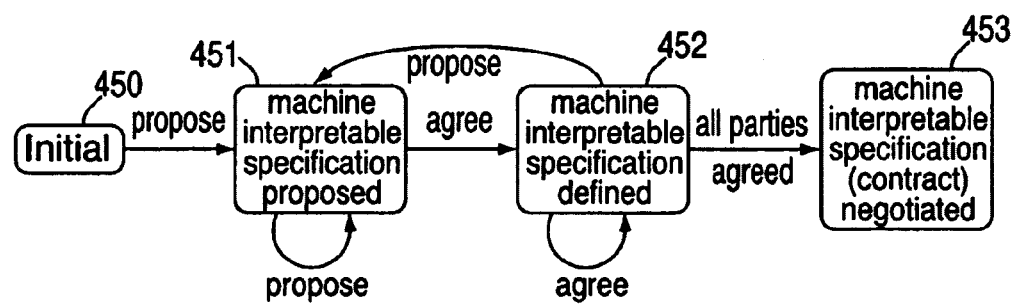
FIG. 4B shows a state diagram of the negotiation of a machine interpretable service specification.

FIG. 4B shows a state diagram of the negotiation of a machine interpretable service specification. Negotiation of a machine-interpretable service specification is a process between all parties that cooperate in the processing of the according service request. The process starts in an initial state 450. A proposal for a service specification by one of the parties leads to state 451. In state 451 some or all parties interact in the definition of the contract by proposing additional modifications to the actual specification. Agreement to the specification by one party ends the definition phase and makes a transition from state 451 to state 452. State 452 awaits the agreement to the defined proposal by all parties. If in state 452 a party makes a new proposal to modify the already defined contract, the process goes back to state 451. After all parties agreed in state 452, negotiation of the specification ends in state 453.

Before parties can cooperate in the processing of a service request, they first have to agree on a service specification that defines and controls the basic, initially defined and agreed upon processing of this kind of request. Only after all parties have agreed, is the processing, which is based on this service specification, activated in the server. The set of activated service specifications can be dynamically extended by the parties. By installing and activating new service specifications the service learns how to process new kinds of requests.

Figure 4C:
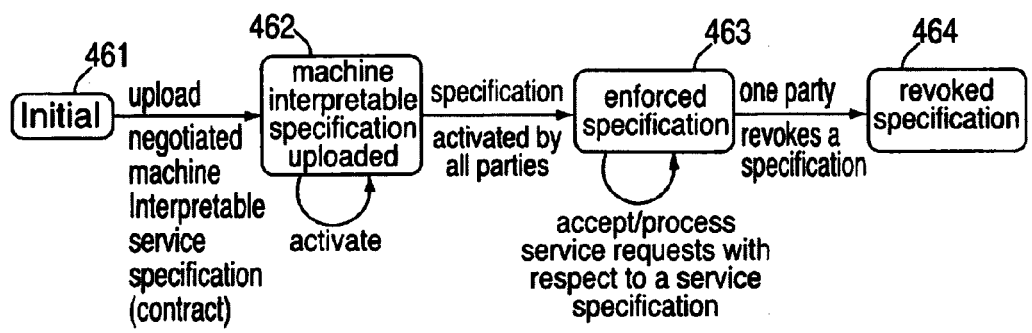
FIG. 4C shows a state diagram for uploading, activation, and revocation of a machine-interpretable service specification.

FIG. 4C shows a state diagram for uploading, activation, and revocation of a machine-interpretable service specification. Starting from an initial state 461, the process makes a transition to state 462 when a service specification is uploaded into the system. State 462 awaits activation of this specification by all parties that negotiated the specification. Once all parties activated the uploaded specification, the process goes to state 463. In state 463, the uploaded specification is enforced by the system. It starts to accept and process service requests according to this specification. More than one specification can be loaded into the system at one point of time. If multiple specifications are active, the service request must identify the specification that should be used for the processing of that request. If at least one party revokes the specification, the process enters state 464. In state 464, the specification is cancelled and no further service requests for this service specification will be accepted by the system.

A service specification can be considered a formal specification, which can be represented as a data structure, as an electronic document. In one embodiment, the activation of a service specification by mutual agreement is implemented in a way where all parties upload electronically signed copies of the service specification to the server. After the server receives such signed copies from all parties, verifies the electronic signatures, and validates, that all copies indeed specify the same service specification, the processing is automatically activated.

Similarly, electronically submitted service specifications can also be cancelled at any time or when they expire. If the parties agree as such, a single party may revoke a service specification or if it expires, the system ceases to honor requests governed by this service specification.

Figure 5:
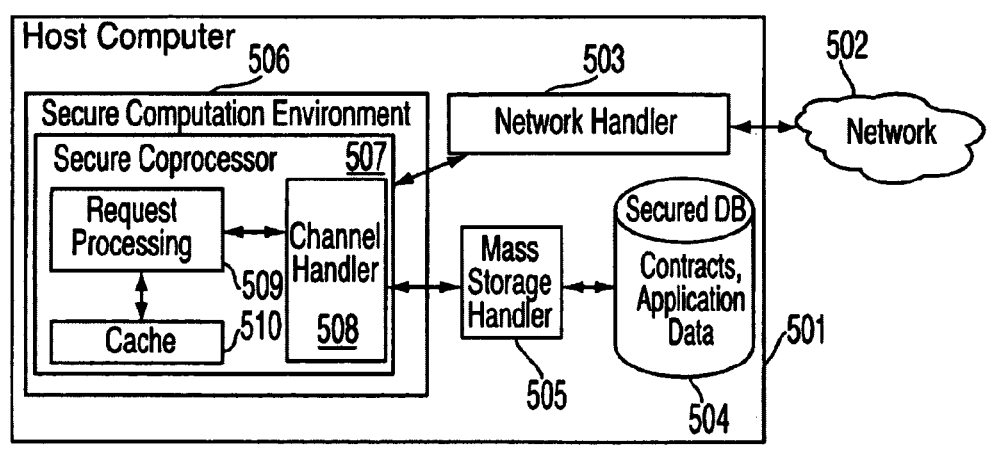
FIG. 5 shows the integration with network and secured database in a service cell according to an embodiment of the present invention.

FIG. 5 shows the integration with network and secured database according to an embodiment of the present invention. The aggregation of a secure computation environment 506 with one or more secure coprocessors 507, a network handler 503, and mass storage handler 505, and one or more secured local databases 504 on the same host computer is also called a service cell or short: a cell. Secure computation environments, like e.g. the IBM 4758 programmable, cryptographic coprocessor, might have no way to directly access a database or a network. FIG. 5 shows how the application code inside the secure computation environment, 506, can securely access a database, 504, and a network, 502. All messages that are sent to the network, 502, are protected by cryptographic techniques, as are all data items stored in the database, 504, like e.g. service specifications and watch lists.

The host computer, 501, hosts the secure computation environment, 506, the network handler, 503, the mass storage handler, 505, and a database, 504. The network handler, 503, uses calls to the operating system of the host computer, 501, to access the network, 502, and to process network requests that come from inside the secure computation environment. The mass storage handler, 505, uses a standard database interface like SQL to access the database, 504, and to process database requests that come from inside the secure computation environment.

The network handler, 503, sends and receives messages to and from the network, 502. Messages are protected using cryptographic techniques, i.e. encryption, authentication, message digests, and sequence numbers. This ensures that an observer can neither interpret nor alter the contents of the messages without being detected. The network handler, 503, receives an incoming, encrypted message from the network, 502, and gives it to the channel handler, 508, inside the secure computation environment, 506. The channel handler, 508, checks the cryptographic checksums, removes sequence numbers and decrypts the data. The request processing, 509, inside the secure computation environment, 506, can now access the data in the clear.

When the request processing, 509, wants to send out a message over the network, it sends it to the channel handler, 508, which encrypts it and adds sequence numbers and message digests. The channel handler, 508, then sends the encrypted message to the network handler, 503, which is on the host, 501, but outside the secure computation environment, 506, which in turn sends it to the network.

If the request processing, 509, wants to access the database, 504, it sends a clear-text request to the channel handler, 508, which encrypts the data in the request and sends it to the mass storage handler, 505, which is on the host, 501, but outside the secure computation environment, 506. The mass storage handler 505, can directly access the database, 504, and returns results from the database to the channel handler, 508, inside the card, where the answer is decrypted and returned to the contract engine.

As an optimization, the request processing, 509, can store parts of the data from the database, 504, in a cache, 510, inside the secure computation environment, 506. This can avoid costly round-trips through the channel handler, 508, the mass storage handler, 505, the database, 504, and back through the mass storage handler, 505, and the channel handler, 508.

FIG. 6 shows an example contract 601 for an application, where individuals are securely checked against watch lists according to an embodiment of the present invention. FIG. 6 gives an example for a contract, 601, that can be used to check individuals against watch lists of criminals. The information given in the table corresponds to the variables defined in the UML class diagrams in FIGS. 3A and 3B. In this example, the contract identifier, 602, is "4711B5" and the involved parties, 603, which are named A, B, and C, are an airport, 603A, which wants to screen applicants, a government agency, 603B, which provides watch lists to be checked against, and a law enforcement office, 603C, which should be notified, when a match is found.

The rows in the table list the single data items produced by the actions that are defined in the contract. For each block of data items, the first column describes the action that produces the data items, the owner of this action and the condition, under which the action is performed. The columns describe for each processing step and each notification, which data items are passed as inputs.

The rows 604 define the service request. Field 605 states that only party A can send the request. The fields, 606, in the second column of the rows 604 state which data items have to be present in the request. Rows 607 define the processing steps of this service specification. In this example, there are three processing steps: "1:n Matching", rows 608, "Biometric Match", row 609, and "Decoy Generation", row 610. The fields 611 in the second column of rows 608 define the data items in the output specification of the processing step "1:n Matching". The fields in the second column of rows 609 and 610 define output specifications with only a single data item for their processing steps. The rows 612 define the four possible notifications of this contract. The fields in the first column of rows 612 define the names, owners and conditions of the notifications, i.e. how the notification is called, to which party it is sent, and under which condition it is sent. The fields in the second column of rows 612 define a single return value in the output specification of the notification.

The columns 608 define the input specifications for processing steps and notifications. There is a column for each processing step and one for each notification. A plus sign (+) in a field indicates that the data item identified by the row in which the plus sign occurs is part of the input specification of the processing step or notification to which the column belongs. A slash (/) in row a, column b indicates that the data item of row a does not belong to the input specification of the processing step or notification of column b. An empty entry ( ) indicates that it makes no sense to decide whether the data item should be included in this input specification or not, because the data item is not yet computed.

The example contract 601 is interpreted as follows: The processing is triggered by a request, 604, sent by party A, which contains the contract id, a first name, last name, date of birth, finger print data, a location and a transaction number.

The first processing step is a 1:n Matching against a watch list named XYZ, 608. This processing step is owned by party B and is executed unconditionally (condition=True). The column named "1:n Matching" defines with +−signs the inputs for this processing step: first name, last name, and date of birth. Outputs are defined in the rows 608: a value stating whether the match was successful, first name, last name, date of birth, a suspect class, fingerprint data from file, information about previous convictions and reaction advice.

The next processing step 609 employs Biometric Matching. It is owned by party C and is only executed, if the 1:n matching was successful. Inputs are the actual fingerprint data and the fingerprint data from the 1:n matching step. The output is a value that states the correlation between those two fingerprints.

Next, the Decoy Generation processing step 610 generates a decoy message, if the 1:n matching was not successful.

The contract 601 defines in rows 612 three alternative notification to party C, one notification to party A and no notification to party B. All notifications have a single output value, which states whether the receiver acknowledged the notification, or not. Notification1 is sent to C, if the 1:n matching succeeded, and the suspect class of the individual is <5. It contains first name, last name, date of birth, the location and the output of the biometric matching. Notification2 is sent to C, if the 1:n matching succeeded, and the suspect class is >4. It contains the fields as Notification2 and additionally a reaction advice. Notification3 is sent in case the 1:n matching failed. It only contains the decoy message, but no data about the checked individual. Notification4 goes to party A. It only contains the transaction number that came in with the actual request and a value that states, whether the service was successful in notifying party C.

From FIG. 6 it is clear, that the information about previous convictions is not disclosed to any party under this contract. It is also clear, that in case of a failed 1:n match, no information about the individual is sent. (The decoy message holds no real data and is only sent to conceal the fact of a match or no match from an attacker who can observe the communication between the service and party C).

If a requestor has multiple service specifications, which he wants to execute together, these contracts can be grouped and executed on behalf of a single request. A contract that bundles several other contracts is called a composite contract. The structure of a composite contract is very similar to that of a basic contract. The difference is that a composite contract does not define processing steps and notification, but enumerates the identifiers of the contracts that should be combined. Like a basic contract, the composite contract, too, has a trigger. The output specification of this trigger defines the union of the output specifications of the basic contracts that should be combined in this composite contract. The contract engine processes a composite contract by invoking the subcontracts on the received request.

In a screening application, for example, this would allow a screener to have a contract for screening against watch lists from agency A and another contract for screening against watch lists from agency B. The combined contract would invoke both searches on behalf of a single request to the system. Other composite contracts may allow checking against yet other combinations.

Biometric information scanned at an entry point can be sent within a request to one or more servers, which process the data and can check it against multiple databases. The workflow is completely up to the participating parties, including sending an alarm to a law enforcement agency instead of returning data about the screened individual back to the screener.

Formal proof of the correctness of an implementation of the proposed processing requires verification of the contract engine and the code for the single processing steps. Because all systems built in this way use the same contract engine, verification of the contract engine is a one-time task. Code for single processing steps has to be verified when it is introduced into the system. Code for single processing steps can be reused by different contracts, which minimizes the overall verification effort.

It is possible to further increase the dynamic features of the described system by making the code of the individual processing steps part of the service specification, in contrast to only providing their names. For techniques that allow the secure downloading of code to the service see for example (Smith, et al., "Securely downloading and executing code from mutually suspicious authorities", U.S. Pat. No. 6,167,521, issued Dec. 26, 2000) hereby incorporated herein by reference in its entirety. Providing the code for the processing steps allows the parties to dynamically extend the functionality of the service and the verification process can be done locally.

Figure 7:
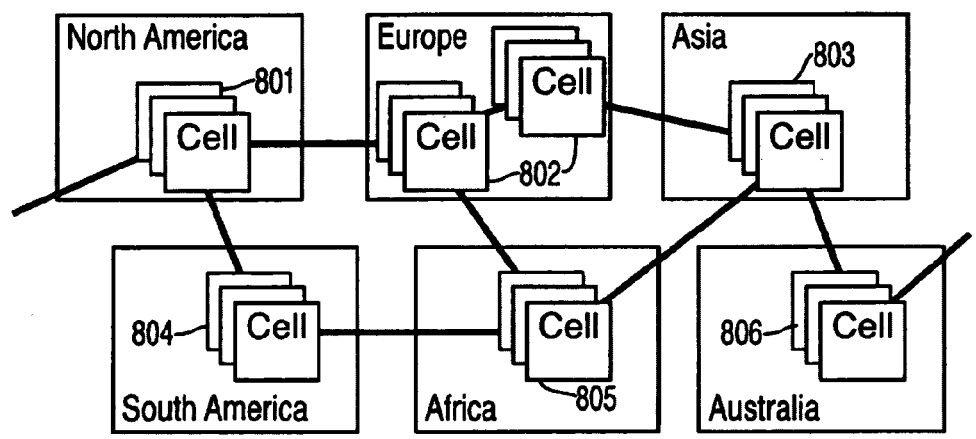
FIG. 7 illustrates an example of a possible distribution according to an embodiment of the present invention.

FIG. 7 illustrates an example of a possible distribution according to an embodiment of the present invention. The invention service consists of several, interconnected service cells. A cell may contain one or more secure computation environments, a network handler, a mass storage handler and one or more secured databases, see also FIG. 5. Multiple cells can be installed in one physical location, but there will be more than one physical location as shown in FIG. 7. The cells 801–806 may reside in different locations as shown in FIG. 7. A client can connect to a subset of the available cells.

This arrangement allows for sufficient amount of resources, and provides a high degree of fault tolerance of the combined service to single malfunctions. Furthermore, it allows for the ability to easily divide the service and the data according to geography and/or national (legal) concerns.

Even though the invention can be implemented in smaller scenarios, the architecture has been prepared for global service.

Figure 8:
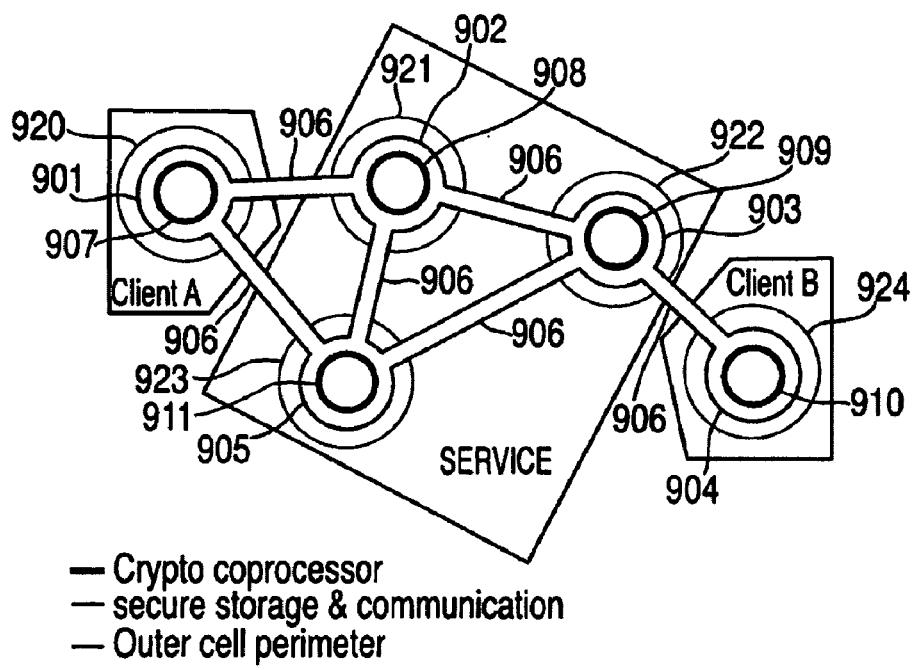
FIG. 8 illustrates different security spheres according to an embodiment of the present invention.

FIG. 8 illustrates different security spheres according to an embodiment of the present invention. Crypto coprocessors 907, 910 are located in Clients A and B as well as in the service (908, 909, 911). The coprocessors 907–911 are physically located with secure storage and communication segments 901–906, all of which are located within an outer cell perimeter 920–924.

Therefore, all sensitive operations are confined within the secure cryptographic coprocessors 907–911. The database content is encrypted at all times, and integrity is secured by message digests. The Intercell communication is encrypted, authenticated and secured against modifications and replays. Finally, the outer cell perimeter 920–924 is secured with firewalls and system level access control.

Figure 9:
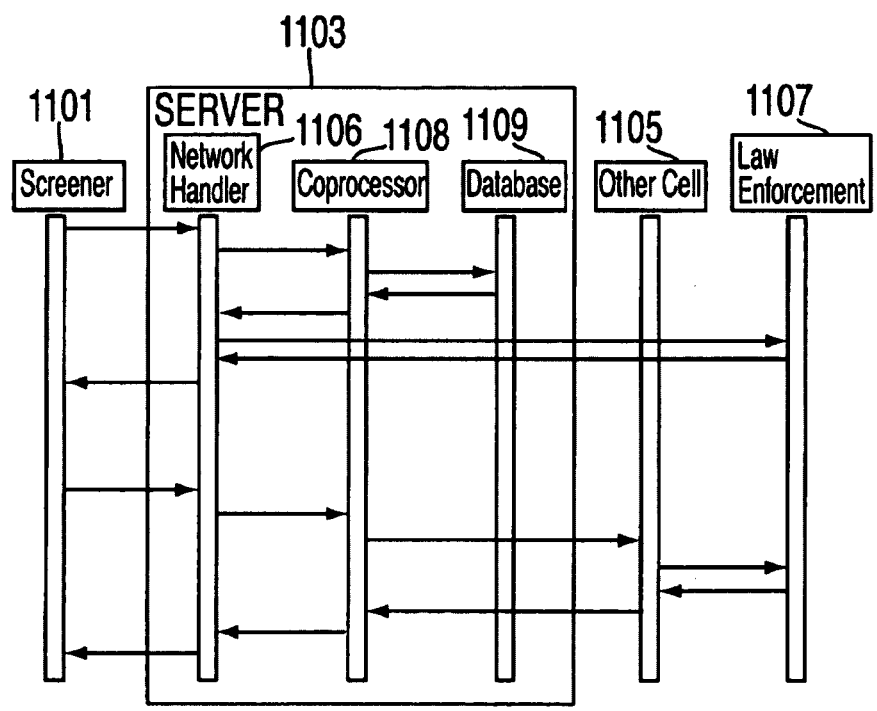
FIG. 9 shows a screening scenario according to an embodiment of the present invention.

FIG. 9 shows a screening scenario according to an embodiment of the present invention. The first one starts with a screening request 1110 from the screener 1101 to a server cell 1103. The cell 1103 receives the request through its network handler 1106 and passes it on into a coprocessor 1108 for processing. If the watch list that should be used for screening is available in this cell, the coprocessor 1108 queries the database 1109 for information about the individual. Then, it uses the network handler to notify law enforcement 1107. This notification is sent in any case. If there is no match, the notification contains a decoy, which is not displayed as an alarm at law enforcement. After the law enforcement 1107 acknowledgement is received, the screener 1101 is notified that his request was processed.

Another scenario is also likely. Here the main difference is that the watch list is not locally available on the screener"s client cell 1103. In this case, the cell forwards the request to a cell 1105 that has the required table. This cell 1105 also notifies law enforcement 1107 and returns a notification for the forwarded request, which is returned to the screener 1101.

Figure 10:
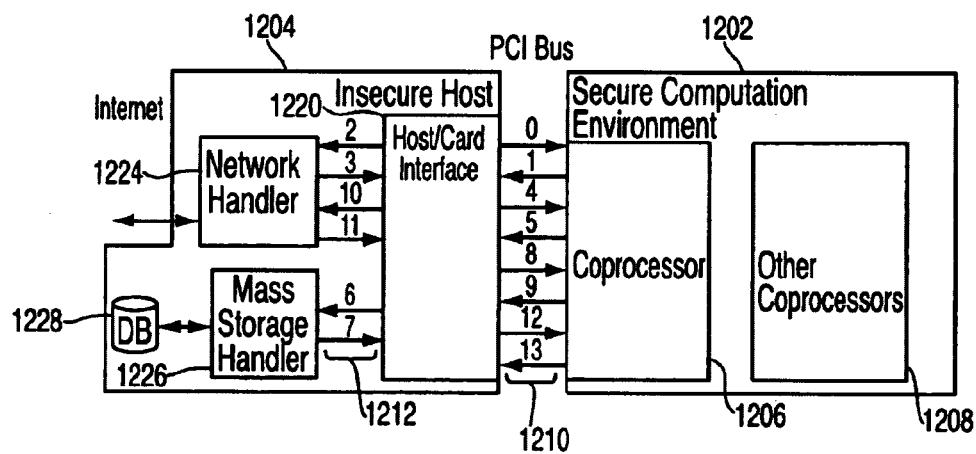
FIG. 10 shows a general structure of an embodiment according to the present invention.

FIG. 10 shows a general structure of an embodiment according to the present invention. While it is likely most of the processing is performed inside the coprocessor as shown in FIG. 10, parts of this invention can be implemented on the host 1204, because the PCI bus 1210 and the serial port are the only ways for the card to communicate with its environment.

The host application has to provide network access 1224 and mass storage 1226. It also must implement the host part of the card/host communication 1220. An insecure host 1204 includes the host/card interface 1220, the network handler 1224, a mass storage handler 1226, and the database 1228. However, the secure computation environment 1202 includes the coprocessor 1206 and other coprocessors 1208 for handling the main part of the secure processing.

Figure 11:
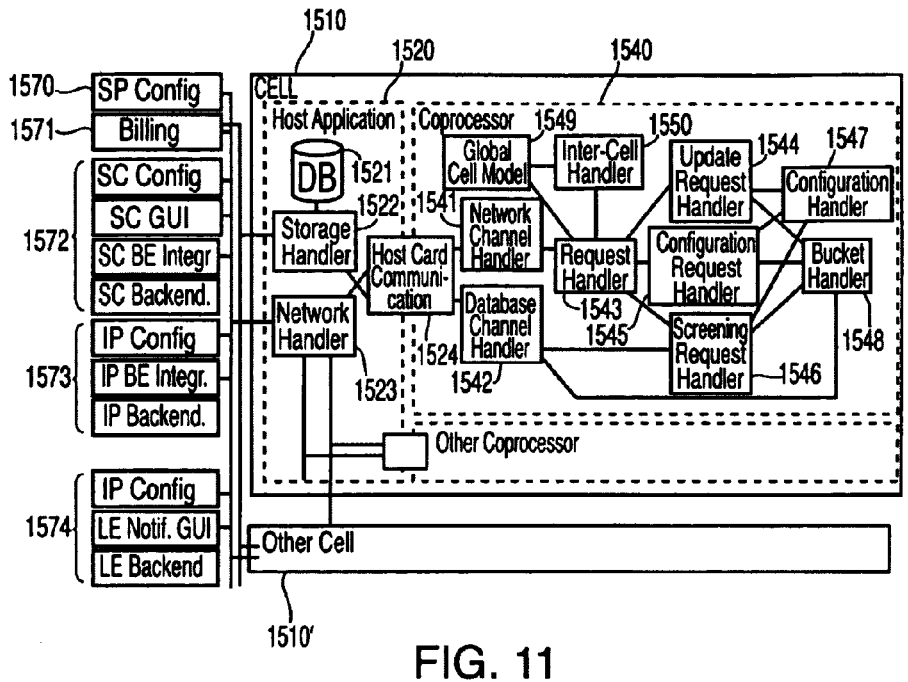
FIG. 11 shows a functional modular diagram according to an embodiment of the present invention.

FIG. 11 shows a functional modular diagram according to an embodiment of the present invention. FIG. 11 shows the basic component architecture, which is comprised of different interfaces and several Cells 1510, 1510', etc. Requests to the system are generated by user interfaces. There are different interfaces for different clients. The service provider has a configuration interface, SP Con FIG. 11570, and a Billing interface 1571 to control and administrate the billing of the service. Screening parties also have configuration interfaces, SC Config 1572, and a graphical user interface to send screening requests, SC GUI. It is likely that the screening party already possesses an IT system, SC Backend, which can automatically generate requests. In this case, a integration component, SC BE Integr, is necessary to hook up that system to the service. The information provider parties also need various interfaces 1573, an integration component, IP BE Integr, to hook up their existing system, IP Backend, to the service. For service configurations, there is a dedicated interface, IP Config. Law enforcement also have configuration interfaces, LE Config 1574, and a graphical user interface, LE Notif GUI, on which alarm messages are displayed. Optionally, it is also possible to forward alarm messages from the GUI, LE Notif GUI, to a law enforcement backend system, LE Backend.

Each cell, Cell 1510, Other Cell 1510', consists of a Host Application 1520 and one or more Coprocessors (Coprocessor 1540, Other Coprocessor). The host application 1520, receives requests via the network handler 1523, to which the interfaces connect. The network handler 1523, forwards requests to one of the coprocessors 1540, 1540' in this cell 1510 via the host-card communication component 1524.

Another component of the host application is the storage handler 1522, which receives database queries from the coprocessor 1540, via the host-card communication component 1524 and delivers them to local or remote databases 1521. Inside the coprocessor 1540, requests coming from the network handler 1523 are processed by the network channel handler 1541, which implements encryption/decryption, authentication, and sessions and forwards the clear-text request to a request handler 1543. The request handler 1543 checks the request for completeness and correctness and then delegates it to one of the specialized handlers. The screening request handler 1546, processes screening requests, the configuration request handler 1545, allows for updates of control structures inside the service, the update request handler 1544, can change the contents of the watchlists, which are used for screening, and the inter-cell handler 1550, is used to forward requests to other cells 1510' and to distribute data to other cells. The inter-cell handler 1550 is controlled by a global cell model 1549, which gets feedback about network quality from the request handler 1543, and thus dynamically learns about the best routes through the network. Most handlers need access to configuration information, which is provided by the configuration handler 1547, and access to the database 1521 on the host, which is provided by the bucket handler 1548, which in turn uses the database channel handler 1542. The database channel handler 1542, handles all encryption/decryption and authentication of data from and to the database 1521.

Figures 12A, 12B:
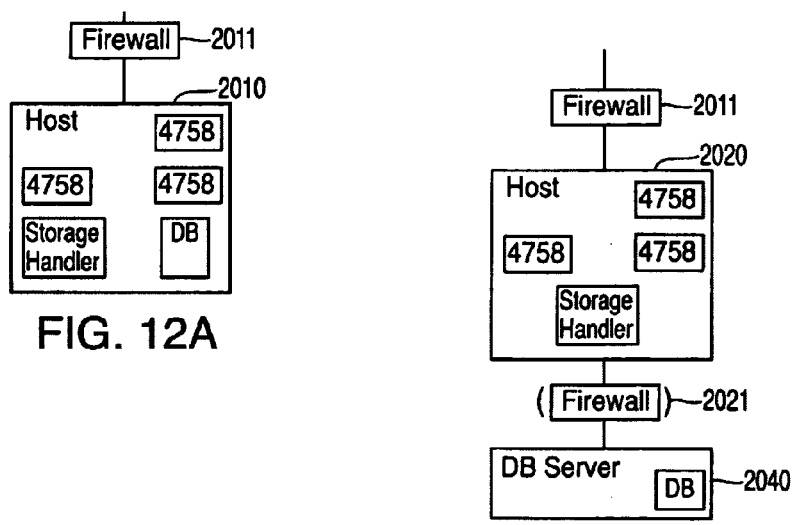
FIGS. 12A–12C show different possible designs according to other embodiments of the present invention.
Figure 12C:
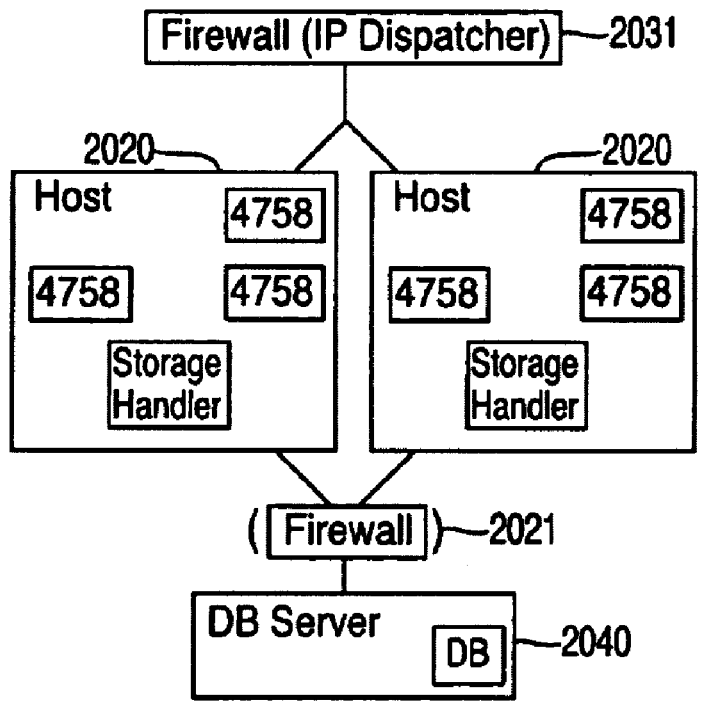

FIGS. 12A–12C show different possible designs according to other embodiments of the present invention. FIGS. 12A through 12C show different possible designs for a single cell: single tier FIG. 12A, two tier FIG. 12B, two tier with replicated application servers FIG. 12C. In the single tier environment a cell will include a firewall 2011 and a host application server 2010. In the two tier case, firewalls 2011 and 2021 are used and the database server 2040 is separate from the host application server 2020. The configuration shown in FIG. 12C includes multiple host application servers 2020.

Another embodiment of the present invention can also reduce the dynamic features of service specifications. Yet at an extreme position, one can completely specialize the system to one service specification or a small number of different service specifications. Technically this can be done by partial evaluation of the contract engine with the known service specifications and optimization of the resulting code. This can be done for example using the approach of (Gafter, "Method and system for translating a software implementation with data-dependent conditions to a data flow graph with conditional expressions", U.S. Pat. No. 5,650,948, issued Jul. 22, 1997) hereby incorporated herein by reference in its entirety. The result is equivalent to a static implementation, in which service specifications are not explicit data objects, and where the enforcement of the agreements between the parties is hard wired in the program code. In such an embodiment, revocation of service specifications and agreement on new service specifications requires re-generation or re-implementation of parts of the software, reinstallation, and a restart of the service.

It is to be understood that the provided illustrative examples are by no means exhaustive of the many possible uses for the invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims

The invention claimed is:

1. A computer-based method for a multiparty electronic service, the method comprising steps of
negotiating a machine interpretable service specification between all parties, which would cooperate with a particular application running on a host system;
defining said service specification to:
identify cooperating parties;
identify a requestor and format of a service request, said request including information about an individual who is not a party to the machine-interpretable service specification;
conduct conditional processing steps required for said service request, said conditional processing steps include using stored data about said individual; and
provide conditional notifications, said notifications including additional information about the individual described in the request;
providing a secure computation environment in said host system;
uploading said service specification into said secure computation environment;
enforcing said service specification with regards to all cooperating parties;
receiving a service request from said requestor;
providing a secure co-processor in said secure computation environment for processing said service request, where said secure processing includes:
determining the service specification that governs said service request;
validating the actual requestor and the content of the service request against an expected requestor and expected contents as defined in the service specification; and
executing the conditional processing and the notifications as defined in the service specification.

2. The method of claim 1 further comprising the step of allowing at least one party of said cooperating parties to cancel said service specification wherein all future service requests that rely on said cancelled service specification will be rejected.

3. The method of claim 2 wherein said steps of negotiating a machine interpretable service specification, uploading, enforcing, receiving a service request, and canceling said service specification comprises the step of conducting said previous steps multiple times.

4. The method of claim 1 further comprising the steps of:
negotiating multiple machine interpretable service specifications; defining said multiple service specifications;
uploading said multiple service specifications into said secure computation environment; and
enforcing said multiple service specifications with regards to all cooperating parties.

5. The method of claim 4 wherein said secure processing steps further comprises the step of having at least one of said secure processing steps being executed unconditionally.

6. The method of claim 1 wherein said secure processing steps further comprises the step of having at least one of said secure processing steps use data provided in said service request and found in said host system to derive further information about said individual described in said service request.

7. The method of claim 6 wherein said at least one of said secure processing steps further comprises the step of computing a correlation between biometric data provided in said service request and biometric data looked up in said host system.

8. The method of claim 1 wherein said step of providing conditional notifications further comprises the step of providing an empty message.

9. The method of claim 1 wherein said step of negotiating a machine interpretable service specification between all parties further comprises the step of providing a contract for governing the negotiated service specification.

10. The method of claim 1 wherein said secure processing steps further comprises the step of notifying said requestor that said service request was processed.

11. The method of claim 1 wherein said step of enforcing said service specification further comprises the step of uploading at least one database from at least one party of said cooperating parties, information contained therein from said at least one database is stored in said host system.

12. The method of claim 4 wherein said step of negotiating multiple machine interpretable service specifications between any cooperating parties further comprises the step of providing a contract for governing each negotiated service specification.

13. The method of claim 1 wherein said step of providing conditional notifications further comprises the step of providing a notification including information about said individual.

14. The method of claim 13, wherein said step of providing a notification including information about said individual further comprises the step of
providing said notification to at least one party of said cooperating parties, said at least one party of said cooperating parties is a party other than said requestor.

15. The method of claim 14, wherein said step of providing a notification to at least one party of said cooperating parties including information about said individual further comprises the step of
providing notification to said at least one party of said cooperating parties that is a party other than a provider of said stored data.

16. The method of claim 1 wherein said step of providing conditional notifications further comprises the step of
providing a notification to at least one party of said cooperating parties including no information about said individual.

17. Apparatus for a multiparty electronic service, the apparatus comprising:
at least one host computer including
at least one secure co-processor operating in
a secure computation environment,
said at least one host computer operative to:
negotiate a machine interpretable service specification between all parties,
which would cooperate with a particular application running on said host computer;
upload said service specification into said secure computation environment;
enforce said service specification with regards to all cooperating parties;
receive a service request from a requestor, the service request including
information about an individual who is not a party to the machine-interpretable service specification;
execute secure processing of said service request; and provide notifications as defined in the service specification.

18. The apparatus of claim 17, wherein said at least one host computer is further operative to define said service specification to:
identify said cooperating parties;
identify said requestor and the format of said service request,
said request including information about an individual;
conduct conditional processing steps required for said service request; and
provide conditional notifications,
said conditional notifications including additional information about the individual described in the request.

19. The apparatus of claim 17 wherein said at least one host computer is further operative to execute said secure processing to:
determine the service specification that governs said service request; validate said requestor and the content of the service request against an expected requestor and expected contents as defined in the service specification; and
execute conditional processing as defined in the service specification.

20. The apparatus of claim 17 wherein said at least one host computer is further operative to provide said notifications as conditional notifications including additional information about an individual described in the request.

21. The apparatus of claim 17 wherein said at least one host computer is further operative to provide a contract for governing the negotiated service specification.

22. The apparatus of claim 17 wherein said at least one host computer operative to negotiate said machine interpretable service specification, upload said service specification, enforce said service specification, and receive a service request, is further operative to conduct said negotiating, uploading, enforcing and receiving functions multiple times.

23. The apparatus of claim 17 wherein said at least one host computer is further operative to use data provided in said service request and found in said host computer to derive further information about an individual described in said service request.

24. The apparatus of claim 23 wherein said at least one host computer is further operative to compute a correlation between biometric data provided in said service request and biometric data looked up in said host computer.

25. The apparatus of claim 17 wherein said at least one host computer is further operative to compute a correlation between biometric data provided in said service request and biometric data looked up in said host computer.

26. The apparatus of claim 17 wherein said at least one host computer operative to provide notifications is further operative to provide an empty message.

27. The apparatus of claim 17 wherein said at least one host computer is further operative to upload at least one database from at least one party of said cooperating parties,
information contained therein from said at least one database includes storing in said host computer.

28. The apparatus of claim 17 wherein said at least one host computer operative to negotiate a machine interpretable service specification between all parties is further operative to:
negotiate multiple machine interpretable service specifications;
define said multiple service specifications;
upload said multiple service specifications into said secure computation environment; and
enforce said multiple service specifications with regards to all cooperating parties.

29. The apparatus of claim 17 wherein said at least one host computer operative to provide notifications is further operative to notify said requestor that said service request was processed.

30. The apparatus of claim 27 wherein said at least one host computer operative to provide notifications is further operative to
provide conditional notifications that including information about an individual.

31. The apparatus of claim 18 wherein said at least one host computer is further operative to provide said conditional notifications to another party of said cooperating parties, said another party of said cooperating parties is a party other than said requestor.

32. The apparatus of claim 31, wherein said at least one host computer operative to provide said conditional notifications to said another party of said cooperating parties is further operative to provide said conditional notifications to a party other than a provider of said stored data.

33. An identification apparatus for matching individuals, the apparatus comprising:
at least one host computer including at least one secure co-processor operating in a secure computation environment,
said at least one host computer operative to:
negotiate a machine interpretable contract between all parties,
which would cooperate with
a particular application running on said host computer;
upload said contract into said secure computation environment;
enforce said contract with regards to all cooperating parties;
receive a service request from a requestor, the service request including information about an individual who is not a party to the machine-interpretable contract;
execute secure processing of said service request; and
provide notifications as defined in the contract.

34. An article of manufacture for use in a multiparty electronic service, comprising a machine readable medium tangibly embodying a program of instructions executable by a machine for implementing a method, the method comprising steps of:
negotiating a machine interpretable service specification between all parties, which would cooperate with a particular application running on a host system;
defining said service specification to:
identify cooperating parties;
identify a requestor and format of a service request,
said request including information about an individual who is not a party to the machine-interpretable service specification;
conduct conditional processing steps required for said service request,
said conditional processing steps including using stored data about said individual; and
provide conditional notifications,
said notifications including additional information about the individual described in the request;

providing a secure computation environment in said host system;
uploading said service specification into said secure computation environment;
enforcing said service specification with regards to all cooperating parties;
receiving a service request from said requestor;
providing a secure co-processor in said secure computation environment for processing said service request, where said secure processing includes:
  determining the service specification that governs said service request;
  validating
    the actual requestor and
    the content of the service request against
    an expected requestor and
    expected contents as defined in the service specification; and executing
    the conditional processing and the notifications as defined in the service specification.

35. A program storage device readable by a machine, tangibly embodying a program of instructions executable by the machine to perform methods steps for managing a matching identification service, the method comprising the steps of:
negotiating a machine interpretable service specification between all parties, which would cooperate with a particular application running on a host system;
defining said service specification to:
  identify cooperating parties;
  identify a requestor and format of a service request, said request including information about an individual who is not a party to the machine-interpretable service specification;
  conduct conditional processing steps required for said service request,
    said conditional processing steps including using stored data about said individual; and
  provide conditional notifications,
    said notifications including
      additional information about the individual described in the request;
providing a secure computation environment in said host system;
uploading said service specification into said secure computation environment;
enforcing said service specification with regards to all cooperating parties;
receiving a service request from said requestor;
providing a secure co-processor in said secure computation environment for processing said service request, where said secure processing includes:
  determining the service specification that governs said service request;
  validating
    the actual requestor and
    the content of the service request
    against
      an expected requestor and
      expected contents as defined in
        the service specification; and
    executing
      the conditional processing and
      the notifications as defined in the service specification.

36. A multiparty electronic service method comprising the steps of:
providing at least one host computer including at least one secure co-processor operating in a secure computation environment;
operating said at least one host computer to negotiate a machine interpretable service specification between all parties, which would cooperate with a particular application running on said host computer;
uploading said service specification into said secure computation environment;
enforcing said service specification with regards to all cooperating parties;
receiving a service request from a requestor, the service request including information about an individual who is not a party to the machine-interpretable service specification;
executing secure processing of said service request; and
providing notifications as defined in the service specification.

37. An identification method for matching individuals, the method comprising the steps of:
providing at least one host computer including at least one secure co-processor operating in a secure computation environment;
operating said at least one host computer to negotiate a machine interpretable contract between all parties, which would cooperate with a particular application running on said host computer;
uploading said contract into said secure computation environment;
enforcing said contract with regards to all cooperating parties;
receiving a service request from a requestor, the service request including information about an individual who is not a party to the machine-interpretable contract;
executing secure processing of said service request; and
providing notifications as defined in the contract.

38. An article of manufacture for use in a multiparty electronic service, comprising a machine readable medium tangibly embodying a program of instructions executable by a machine for implementing a method, the method comprising steps of:
providing at least one host computer including at least one secure co-processor operating in a secure computation environment;
operating said at least one host computer to negotiate a machine interpretable service specification between all parties, which would cooperate with a particular application running on said host computer;
uploading said service specification into said secure computation environment;
enforcing said service specification with regards to all cooperating parties;
receiving a service request from a requestor, the service request including information about an individual who is not a party to the machine-interpretable service specification;
executing secure processing of said service request; and
providing notifications as defined in the service specification.

39. A program storage device readable by a machine, tangibly embodying a program of instructions executable by the machine to perform methods steps for managing a matching identification service, the method comprising the steps of:
providing at least one host computer including at least one secure co-processor operating in a secure computation environment;

operating said at least one host computer to negotiate a machine interpretable service specification between all parties, which would cooperate with a particular application running on said host computer;

uploading said service specification into said secure computation environment;

enforcing said service specification with regards to all cooperating parties;

receiving a service request from a requestor, the service request including information about an individual who is not a party to the machine-interpretable service specification;

executing secure processing of the service request; and providing notifications as defined in the service specification.

40. An article of manufacture for use in matching individuals, comprising a machine readable medium tangibly embodying a program of instructions executable by a machine for implementing a method, the method comprising steps of providing at least one host computer including at least one secure co-processor operating in a secure computation environment;

operating said at last one host computer to negotiate a machine interpretable contract between all parties, which would cooperate with a particular application running on said host computer;

uploading said contract into said secure computation environment;

enforcing said contract with regards to all cooperating parties;

receiving a service request from a requestor, the service request including information about an individual who is not a party to the machine-interpretable contract;

executing secure processing of said service request; and providing notifications as defined in the contract.

41. A program storage device readable by a machine, tangibly embodying a program of instructions executable by the machine to perform methods steps for managing a matching identification service, the method comprising the steps of:

providing at least one host computer including at least one secure co-processor operating in a secure computation environment;

operating said at least one host computer to negotiate a machine interpretable contract between all parties, which would cooperate with a particular application running on said host computer;

uploading said contract into said secure computation environment;

enforcing said contract with regards to all cooperating parties;

receiving a service request from a requestor, the service request including information about an individual who is not a party to the machine-interpretable contract;

executing secure processing of said service request; and providing notifications as defined in the contract.

42. A computer-based method for a multiparty electronic service, the method comprising steps of:

implementing on a computer system at least one contract for governing a service between a service provider, a client and at least one other party;

receiving at said service provider a first request from a client, the first request including information about an individual who is not one of the service provider, a client and at least one other party;

sending from said service provider a data request to one of at least one other party;

receiving, at said service provider from said one of at least one other party, a data response in a secure computation environment;

determining, in accordance with said contract, whether a match exists between said first request and said data response;

if a match results from said determining step, providing a notification of said match to said at least one other part.

43. The method of claim 42 further comprises the step of providing said notification even if there is no match as determined in said determining step.

44. The method of claim 43, wherein said step of providing said notification comprises the step of providing a dummy message to said at least one other party.

45. The method of claim 42 further comprises the step of notifying said client that said first request was processed.

46. The method of claim 42 wherein the implementing the at least one contract step comprises the step of assigning a contract ID for any contract that governs a service between the service provider, the client and the at least one other party.

47. The method of claim 42 further comprises the step of executing the previous steps in a contract engine within the secure computation environment.

48. The method of claim 47 further comprises the step of providing a plurality of contract engines coupled to a communication network.

49. The method of claim 42 wherein the determining step comprises the step of performing the determination in a crypto-coprocessor.

50. A computer-based method for a multiparty electronic service, the method comprising steps of:

implementing on a computer system at least one contract for governing a service between
 a service provider,
 a client and
 at least one other party;

determining, in accordance with said contract, whether a match exists between
 a first request from said client and
 a data response from one of at least one other party, the first request including information about an individual who is not one of the service provider, a client and at least one other party;

if a match results from said determining step, providing a notification of said match to said at least one other party.

51. The method of claim 50 further comprises the step of providing said notification even if there is no match as determined in said determining step.

52. The method of claim 51, wherein said step of providing said notification comprises the step of providing a dummy message to said at least one other party.

53. The method of claim 50 further comprises the step of notifying said client that said first request was processed.

54. The method of claim 50 wherein the implementing the at least one contract step comprises the step of assigning a contract ID for any contract that governs a service between the service provider, the client and the at least one other party.

55. A computer-based method for managing a matching identification service, the method comprising the steps of:

implementing on a computer system at least one contract having a contract ID for governing said matching identification service between a service provider,
a client and
at least one other party determining, in accordance with said contract ID, whether a match exists between
a first request from said client and
a data response from one of at least one other party, the first request including information about an individual who is not one of the service provider, a client and at least one other party;
if a match results from said determining step,
providing a notification of said match to said at least one other party.

56. The method of claim 55 further comprises the step of providing said notification even if there is no match as determined in said determining step.

57. The method of claim 56, wherein said step of providing said notification comprises the step of providing a dummy message to said at least one other party.

58. The method of claim 55 further comprises the step of notifying said client that said first request was processed.

59. Apparatus for a multiparty electronic service, the apparatus comprising:
at least one host computer operative to:
maintain and enforce at least one contract for governing a service between a
service provider,
a client and
at least one other party; and
to determine, in accordance with said at least one contract, whether a match exists between
a first request from said client and
a data response from one of at least one other party, the first request including information about an individual who is not one of the service provider, a client and at least one other party;
said at least one host computer is further operative to provide a notification to said at least one other party if a match results from said determination.

60. The apparatus of claim 59, wherein said at least one host computer is further operative to provide said notification to said at least one other party if no match results from said determination.

61. The apparatus of claim 60, wherein said at least one host computer is further operative to provide a dummy message to said at least one other party.

62. The apparatus of claim 59, wherein said at least one host computer is further operative to provide a notification to said client that said first request was processed.

63. The apparatus of claim 59, wherein said at least one host computer comprises:
a secure computation environment for processing sensitive data;
a network handler for sending and receiving messages to and from said secure computation environment and a network; and
a storage handler to process database requests that come from inside said secure computation environment and retrieves information from a secured database containing said contracts and private information data.

64. The apparatus of claim 59, wherein said at least one host computer is further operative to provide a contract ID for any contract that governs a service between the service provider, the client and the at least one other party.

65. Apparatus for a matching identification service, the apparatus comprising:
at least one host computer operative to:
maintain and enforce at least one contract having a contract ID for governing a service between
a service provider,
a client and
at least one other party; and
to determine, in accordance with said at least one contract, whether a match exists between
a first request from said client and
a data response from one of at least one other party, the first request including information about an individual who is not one of the service provider, a client and at least one other party;
said at least one host computer is further operative to provide a notification to said at least one other party if a match results from said determination.

66. The apparatus of claim 65, wherein said at least one host computer comprises:
a secure computation environment for processing sensitive data;
a network handler for sending and receiving messages to and from said secure computation environment and a network; and
a storage handler to process database requests that come from inside said secure computation environment and retrieves information from a secured database containing said contracts and private information data.

67. The apparatus of claim 66, wherein said secure computation environment comprises a contract engine operative to:
handle said first request, conduct a matching task, and provide a respond serving as said notification.

68. The apparatus of claim 65, wherein said at least one host computer is further operative to provide said notification to said at least one other party if no match results from said determination.

* * * * *

UNITED STATES PATENT AND TRADEMARK OFFICE
CERTIFICATE OF CORRECTION

PATENT NO. : 7,107,445 B2
APPLICATION NO. : 10/065802
DATED : September 12, 2006
INVENTOR(S) : Martin Trapp et al.

It is certified that error appears in the above-identified patent and that said Letters Patent is hereby corrected as shown below:

<u>Column 4,</u>
Line 62, after "information" delete "leaks" and insert therefor --leak--.

<u>Column 5,</u>
Line 20, after "requester", delete "110" and insert therefor --101--.

<u>Column 8,</u>
Line 3, before "uniform" delete "an" and insert therefor --a--.
Line 33, after "of", delete "requests" and insert therefor --request--.

<u>Column 13,</u>
Line 31, before "to" (first occurrence), delete "notification" and insert therefor --notifications--.

<u>Column 15,</u>
Line 50, before "integration", delete "a" and insert therefor --an--.

<u>Column 18,</u>
Line 14, after "further", delete "comprises" and insert therefor --comprise--.

<u>Column 19,</u>
Line 35, after "computer", insert --is--.

<u>Column 20,</u>
Line 12, after "that", delete "including" and insert therefor --includes--.

<u>Column 23,</u>
Line 24, after "at" delete "last" and insert therefor --least--
Line 40, after "perform", delete "methods" and insert therefor --method--.

<u>Column 24,</u>
Line 10, after "other", delete "part" and insert therefor --party--.

UNITED STATES PATENT AND TRADEMARK OFFICE
CERTIFICATE OF CORRECTION

PATENT NO.       : 7,107,445 B2
APPLICATION NO.  : 10/065802
DATED            : September 12, 2006
INVENTOR(S)      : Martin Trapp et al.

It is certified that error appears in the above-identified patent and that said Letters Patent is hereby corrected as shown below:

Column 26,
Line 46, after "a" delete "respond" and insert therefor --response--.

Signed and Sealed this

Fifth Day of December, 2006

JON W. DUDAS
*Director of the United States Patent and Trademark Office*